H. L. DE ZENG.
OPTICAL INSTRUMENT.
APPLICATION FILED NOV. 9, 1912.
1,059,715.
Patented Apr. 22, 1913.
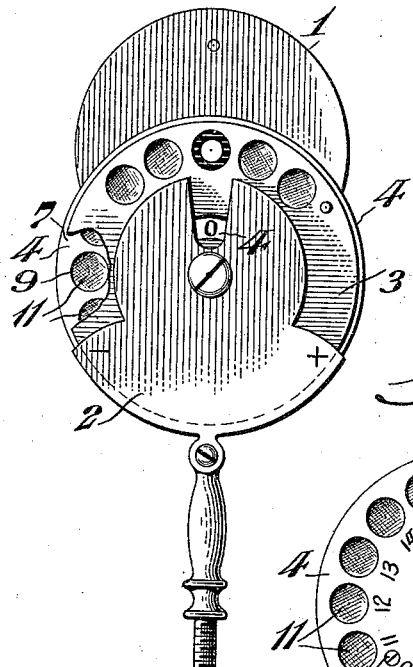
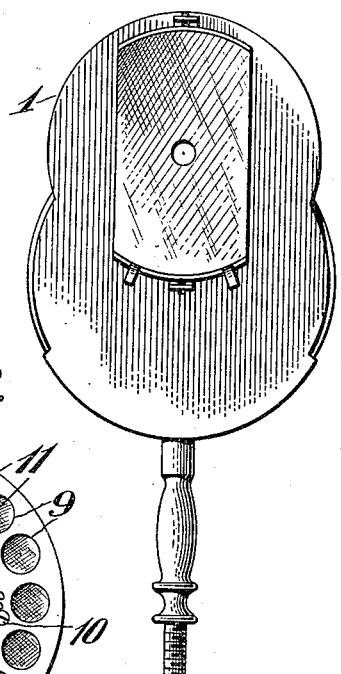
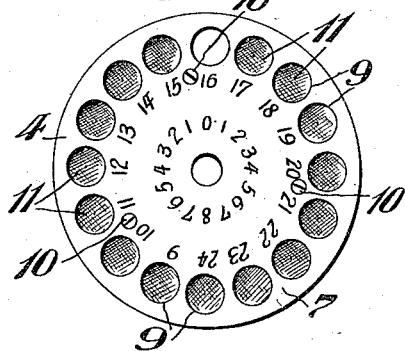
WITNESSES
H. E. Dieterich
P. F. Nagle.
INVENTOR
Henry L. De Zeng,
BY Wiedersheim & Fairbanks
ATTORNEYS

UNITED STATES PATENT OFFICE.

HENRY L. DE ZENG, OF MAPLE SHADE, NEW JERSEY.

OPTICAL INSTRUMENT.

1,059,715.  Specification of Letters Patent.  Patented Apr. 22, 1913.

Application filed November 9, 1912. Serial No. 730,410.

*To all whom it may concern:*

Be it known that I, HENRY L. DE ZENG, a citizen of the United States, residing at Maple Shade, county of Burlington, State of New Jersey, have invented a new and useful Optical Instrument, of which the following is a specification.

My invention relates to a new and useful improvement in an optical instrument, such as an ophthalmoscope, and consists in providing means for securing the lens or lenses in place.

It further consists of other novel features of construction, all as will be hereinafter fully set forth.

The annexed drawing and the following description set forth in detail one mechanical form embodying the invention, such detail construction being but one of various mechanical forms in which the principle of the invention may be used.

Figures 1 and 2 represent elevations of the rear and front of an ophthalmoscope. Fig. 3 represents a plan view of a disk employed. Fig. 4 represents a sectional view showing the plates, forming the disk, in separated position. Fig. 5 represents a sectional view showing the plates, secured together, and with the lenses in position.

Similar numerals of reference indicate corresponding parts in the figures.

Referring to the drawings:—1 designates an ophthalmoscope which is of suitable construction; as here shown, it is formed of a casing 2, on which is rotatably mounted the disk 3 having a suitable number of lenses, and adjacent which disk is a second disk 4, which is also provided with a suitable number of lenses mounted therein, and with an opening, free from a lens, it being understood that the said disks are provided with proper notations.

In order to secure the lenses in position, I form the disks of a plurality of plates secured together, provision being provided for locking the lenses in position thereby. As here shown, each disk consists of a main plate 5, which is provided with a desired number or series of openings 6, which are of suitable size in order to receive the lenses. Upon each side of the main plate, I provide auxiliary plates 7 and 8, which plates have a similar number or series of openings 9 therein, which are of a size smaller in diameter than the openings 6, in the main plate 5, and the openings 9 in the two auxiliary plates 7 and 8, being preferably of the same size.

10 designates means for securing the three plates together, which, in the present instance, are shown as screws, it being understood that before the plates are secured together, the lenses 11 are inserted in the openings 6 in the main plate 5, and as the openings 9 in the two auxiliary plates 7 and 8 are of smaller diameter than the openings in the main plate 5, when the three plates are clamped or locked together, the said lenses 11 will be securely held in position in the openings 6 in the main plate 5 by the engagement therewith of the walls around the openings 9 of the auxiliary plates 7 and 8.

By this means it will be understood that I have provided a positive lock or securing means for the lenses, which is simple in construction, but which accomplishes the desired result. It will be further understood that while I have shown and described the invention in conjunction with an ophthalmoscope, I do not desire to be limited to this form of instrument, as this means of fastening the lenses is applicable to any instrument, where it is desired to secure a lens or lenses in position.

Having thus described my invention, what I claim as new and desire to secure by Letters Patent, is:—

1. In an optical instrument, a plate having an opening therein, an auxiliary plate on each side of said first mentioned plate, each of said auxiliary plates having an opening of less diameter than the opening in said first mentioned plate, a lens within the opening of the first mentioned plate and held therein by the said auxiliary plates, and means for holding said plates in normal relative position.

2. In an optical instrument, a main plate, having a series of openings therein, an auxiliary plate on each side of said main plate and each having a series of openings of less diameter than the openings in said main plate, lenses within the openings of the main plate and held therein by said auxiliary plates, and means for holding the said plates in relative position.

HENRY L. DE ZENG.

Witnesses:
WM. CANER WIEDERSEIM,
C. D. McVAY.

Copies of this patent may be obtained for five cents each, by addressing the "Commissioner of Patents, Washington, D. C."